July 28, 1942.   L. G. SIMPSON   2,291,000
APPARATUS FOR PRODUCING MULTIFOCAL LENSES
Filed Dec. 5, 1940   2 Sheets-Sheet 1
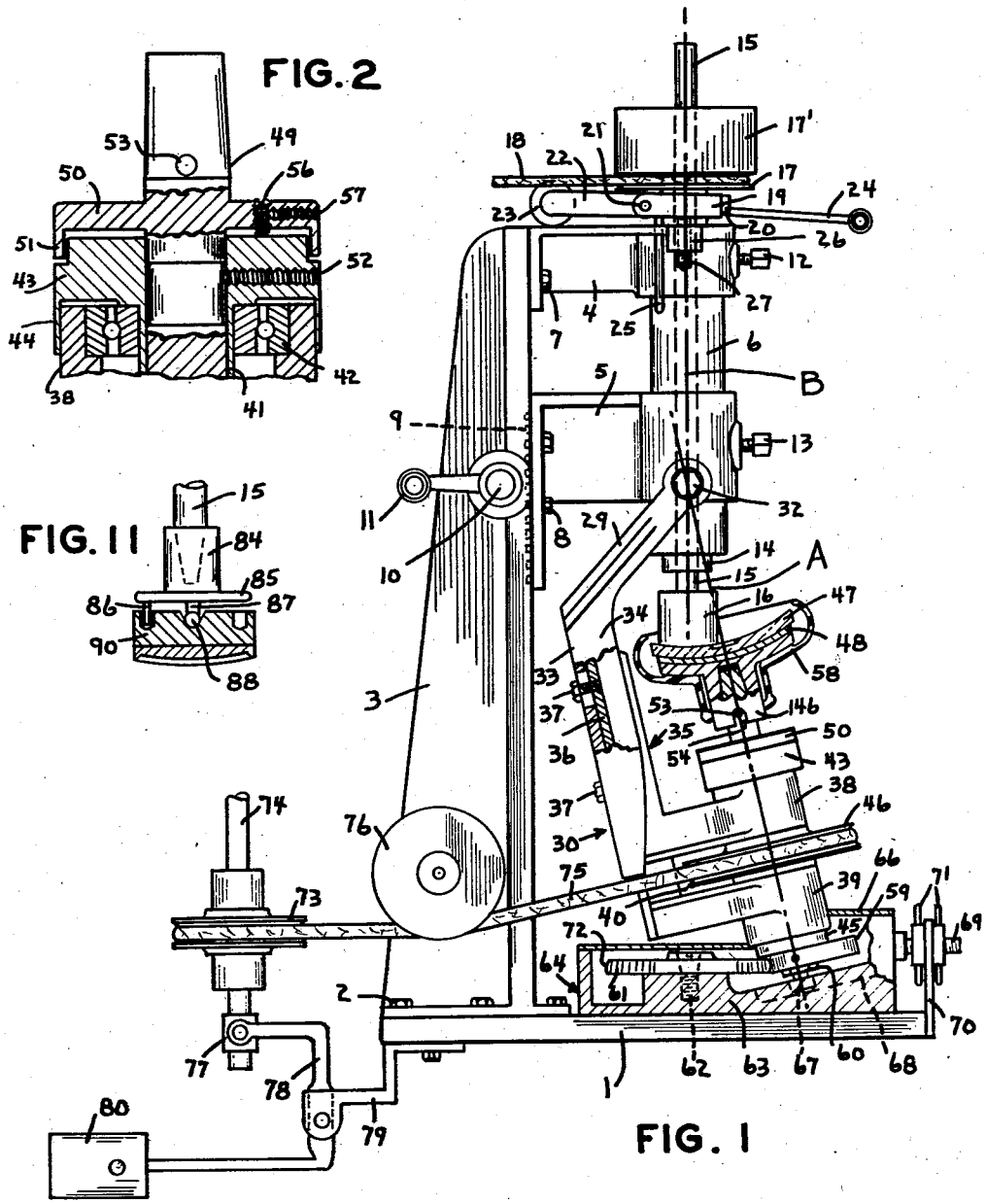
LEON G. SIMPSON
INVENTOR

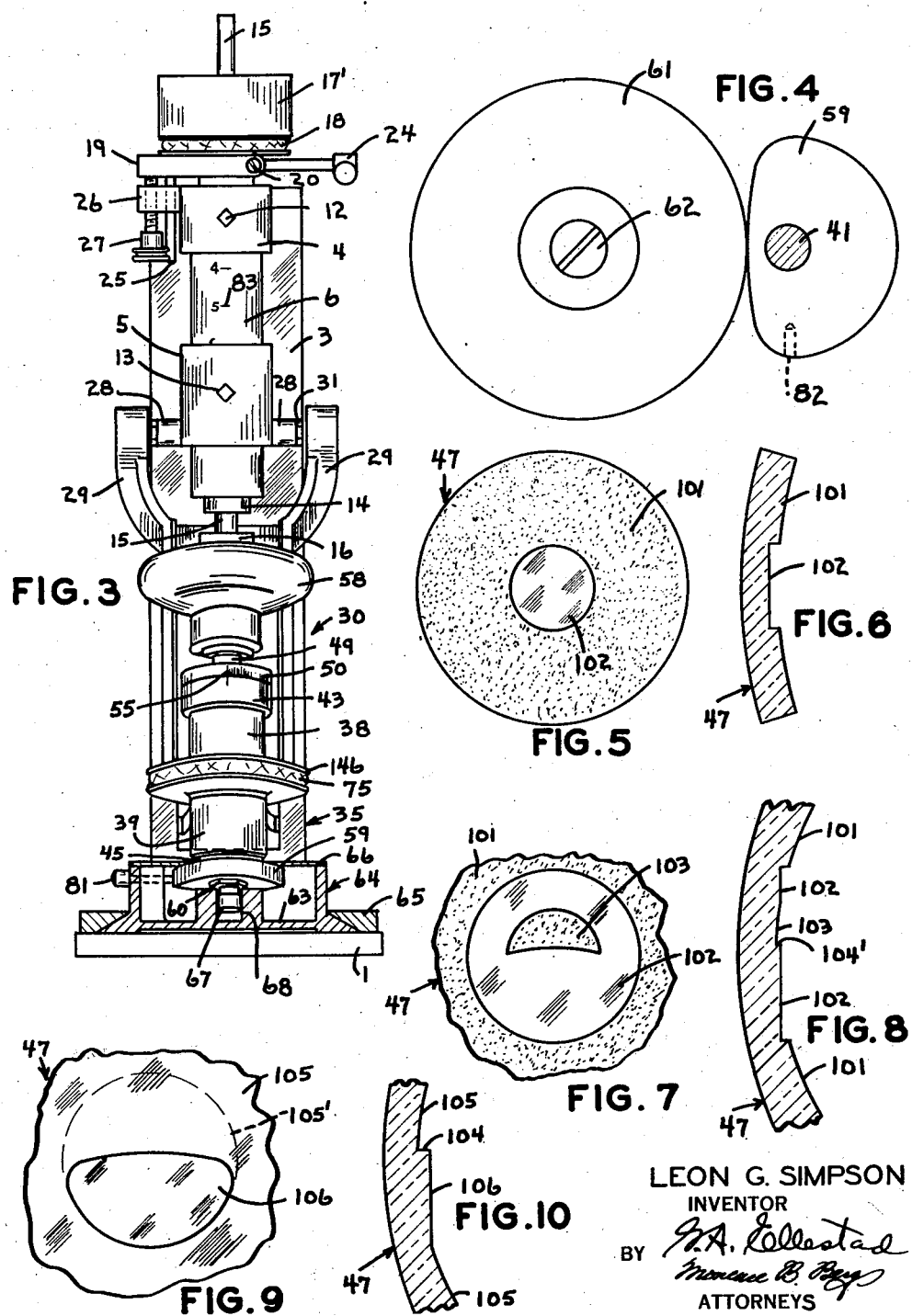

Patented July 28, 1942

2,291,000

UNITED STATES PATENT OFFICE 2,291,000

APPARATUS FOR PRODUCING MULTIFOCAL LENSES

Leon G. Simpson, Rochester, N. Y., assignor to Bausch & Lomb Optical Company, Rochester, N. Y., a corporation of New York Application December 5, 1940, Serial No. 368,675

8 Claims. (Cl. 51—124)

My invention relates to apparatus for producing multifocal ophthalmic lenses and more particularly has reference to the production of one-piece multifocal lenses of the bifocal type which are provided with a non-circular reading portion or segment.

In one prior art process for producing bifocal lenses with reading segments of non-circular shape, a lens blank is formed on its concave side with a ground and polished circular reading portion which is depressed with respect to an annular surrounding partially finished area, which latter generally provides the distance portion for the lens. This partially finished area is then ground and polished to produce the finished distance portion of the desired curvature, the grinding being so controlled that a part of the finished reading segment is ground away and is converted into a part of the surrounding area or distance portion. By this grinding, the reading segment is given a non-circular shape which, under one practice, has an outline like that produced by joining together the ends of arcs of unequal radii to form a closed figure, the arc of smaller radius being subtended by an angle of greater than 180°. Under such circumstances a shoulder or ledge is formed on the upper or "flat" edge of the segment which continues past the junctions of the arcs forming the reading segment and merges into the surface of the distance portion of the lens along the lower semi-circular like sides of the segment.

The prior art has provided apparatus or a machine for producing lens blanks of the above described type which makes use of a vertical rotating spindle and a second spindle which is angled with respect thereto. In this type of machine both spindles are maintained in the same vertical plane so that their longitudinal axes will intersect with each other. One of the spindles carries an abrading tool for forming a surface on a lens blank carried on the other spindle. Also one of these spindles is pivoted so that it may be oscillated by predetermined impulses produced by a cam which is shaped to an outline identical with that to be given to the segment for the lens blank undergoing grinding.

These prior art devices possess certain disadvantages and defects, among them being the fact that the means utilized for maintaining the axes of the spindles in intersecting relation in the same vertical plane is extremely complicated, requires frequent adjustment, is difficult to adjust and is generally of a nature which precludes the fine adjustment necessary for closely accurate work. Another serious defect of prior art machines may be found in their constructional arrangement, especially in connection with the location and mounting of the cam, which results in a high rate of spoilage for lenses undergoing finishing due to the frequent occurrence of shipping of the shoulder which partially surrounds the reading segment by the abrading tool. Other disadvantages of devices employed in present practice reside in the visible inaccessibility of the adjustment mechanism for permitting positioning of the lens blank at desired locations on its spindle where some degree of prism has been ground in the reading segment as well as the lack of rigidity of construction for the machine as a whole coupled with its lack of simplicity of design and operation.

It is hence a major object of my invention to provide apparatus for producing multifocal ophthalmic lens blanks which lacks those inherent disadvantages and defects common to prior art machines of this nature.

An equally important object of my invention resides in the provision of an improved machine for producing multifocal ophthalmic lenses which is of rigid construction as well as of simple design and facile operation.

Another object of the invention is to provide in a machine for producing ophthalmic lenses which has a fixedly positioned spindle and an oscillating spindle, a construction of such nature that the spindle axes are constantly and automatically maintained in intersecting relation in the same vertical plane.

Still another object is the provision of means for suspending a spindle of a machine of the class described from a fixedly positioned spindle of such machine so that the suspended spindle may pivot about an axis which is perpendicular to the longitudinal axis of the fixed spindle together with means for lengthening the connection between the spindles so as to vary the radius of the arcuate path of movement of the suspended and pivoted spindle.

A further object of the invention is the provision of a construction designed to eliminate chipping of the shoulder of the reading segment of a lens blank undergoing grinding on a machine of the described type by means assuring steady bearing contact of the cam for moving the pivoted spindle with its cam roller.

Yet a further object of the invention comprehends the provision in a machine for producing ophthalmic lenses, which machine has a pivoted oscillating spindle actuated by a cam in contact with a cam roller, of novel means for adjusting the position of the center of the cam roller with respect to the center for the arcuate movement of the spindle.

With these and other objects in view, which may be incident to my improvements, the invention consists in the parts and combinations to be hereinafter set forth and claimed, with the understanding that the several necessary elements comprising my invention may be varied in construction, proportion and arrangement without departing from the spirit of the invention and the scope of the appended claims.

In order to make my invention more clearly understood, I have shown in the accompanying drawings means for carrying the same into practical effect without limiting the improvements in their useful applications to the particular constructions which, for the purpose of explanation, have been made the subject of illustration.

In the drawings:

Figure 1 is a side elevation of my improved machine.

Figure 2 is a partial longitudinal sectional view showing in detail the upper portion of the lower spindle, the lens blank carrier being removed.

Figure 3 is a front elevation of the machine shown in Figure 1.

Figure 4 is a plan view showing in detail the cam and cam roller employed with the machine of my invention.

Figure 5 is a plan view of a lens blank in a form ready for the abrading operations of my machine and discloses a blank having an outer annular area and inner circular area or segment which latter has been ground and polished to desired curvature.

Figure 6 is a section of the blank shown in Figure 5 and shows the manner in which the circular inner area is depressed below the surface of the annular outer area.

Figures 7 and 8 disclose, respectively, an enlarged partial plan and sectional view of the lens blank of Figure 5 is the course of the abrading operation of my machine and illustrate a portion of the inner circular area in cutaway condition at an intermediate stage in the grinding process.

Figures 9 and 10 are, respectively, an enlarged partial plan and sectional view of a lens blank following completion of the grinding and polishing operations performed by the machine of my invention, the reading segment being shown in its completed form in full line and the cutaway portion of the circular area being indicated within the dotted line employed to show the circumference of the original circular area.

Figure 11 is an elevation of a polishing tool employed with the machine of Figures 1 and 3.

There is disclosed in Figures 1 and 2, wherein like reference numerals, as is the case throughout the drawings, are employed to designate similar parts, a machine having a base 1 upon which there is mounted by bolts 2 a standard 3 having an upper support bracket 4 and a lower support bracket 5 for fixedly supporting a spindle housing 6 in a vertical position. The upper bracket 4, which may be of L shape, is fixed to the standard 3 by cap screws 7 while the lower bracket 5, which may also be of L shape, is slidable in a guideway (not shown) on the face of the standard and is held in adjusted vertical position by means of the cap screws 8. To provide for adjustment of the bracket 5, rack teeth 9 are formed on the back of the depending leg thereof for engagement by a suitable pinion (not shown) fixed on the shaft 10 supported on the standard and rotated by means of the crank 11.

Each of the support brackets has its outer end provided with a circular bearing adapted to engage the body of the spindle housing 6 in the manner disclosed. The housing 6, which is vertically slidable, is fixedly held in the bearings of the support brackets in the adjusted position shown by suitable means, such for example as the set screws 12 and 13. For a purpose which will later become apparent, the lower support bracket 5 is slidable upon the fixedly secured spindle housing 6.

Slidably mounted within the spindle housing 6 in any well known manner is the non-rotating quill or sleeve 14 which is of a length sufficient to extend beyond each end of the spindle housing. The sleeve 14 forms a bearing for an upper spindle 15 which, in the usual manner, is rotatably mounted therein and slidable with the sleeve. This spindle 15 is adapted to have any well known type of abrading tool such as the grinding tool 16 shown in Figures 1 and 3 or the polishing tool of Figure 11 detachably secured to its lower end while at its upper end there is secured a drive pulley 17 driven through a suitable power source provided for rotating the upper spindle by means of the belting 18 or other suitable driving connection. Above the drive pulley 17 there is mounted on the spindle the usual weight 17' for maintaining the abrading tool in pressure contact with a lens blank when the tool is in operating position.

The means for supporting and raising and lowering the bearing sleeve 14 and its upper spindle comprise a lifting collar 19 which engages the upper end of the bearing sleeve and is fastened thereon in the position shown by the screw threaded fastening means 20. Fixed to a pivot shaft 21 carried by the lifting collar 19 near the back thereof is a lifting finger 22. The outer end of finger 22 carries a rotatable roller 23 which constantly contacts the upper horizontal surface of the bracket 4. Pivot shaft 21 also has a lifting handle 24 fixed thereto. It will be apparent from Figure 1 that the shaft 21 and finger 22 fixed thereto will be moved into a counterclock direction upon raising the handle 24. This results in elevating the lifting collar 19, bearing sleeve 14 and spindle 15 above the positions which these parts occupy in the drawings. Obviously, the bearing sleeve 14 and spindle 15 will be supported in elevated condition upon finger 22 if the latter is swung in a counterclock direction through an angle somewhat greater than 90° arcuate degrees and is maintained in such position, that is to say in a position so that the center of roller 23 lies to the right of the pivot axis 21. Counterclockwise arcuate movement of the finger 22 is controlled by any conventional stop mechanism designed to limit the rotation of the pivot shaft 21.

The upper flange of the upper bracket 4 has a guide rod 25 extending therethrough and secured thereto. This rod is adapted to extend through a bore in the lifting collar 19 as shown and serves as a guide for the collar and a means for maintaining it in centered relation to the bearing sleeve 14.

It may be noted that the housing bearing on the upper bracket is provided with an extension 26 which is threaded to receive a thumb screw 27. As will hereinafter appear, thumb screw 27 provides an adjustable stop, whose position is varied during the grinding operation of the machine, to limit the downward vertical movement of the upper spindle.

Important features of the invention, as already pointed out, reside in the support provided for the lower spindle as well as in the structural members utilized to form this support. To this end, the spindle housing bearing on the lower support bracket 5 is provided with diametrically opposing pivots or studs 28 upon which are pivotally mounted, in suitable anti-friction bearings, the forks 29 of a bifurcated support arm 30. The studs 28 are so positioned that their axes are horizontal and intersect the longitudinal axis of the upper spindle 15. Suitable means such as nuts 31, and 32 are employed to secure forks 29 upon their pivots. Thus, in effect, the studs 28 provide pivot members which are adjustably slidable upon the spindle housing 6 due to their formation on the spindle housing bearing of the slidable lower bracket 5.

The bifurcated end 29 of the support arm 30 extends downwardly and in a rearward direction towards the standard 3 and at its lower extremity merges into a downwardly and, as shown in Figure 1, a forwardly extending lower portion 33 which is provided with overturned sides 34. In order to support the lower spindle from depending arm 30, use is made of an L shaped bearing bracket 35, the longest leg of which is provided with a flange 36 substantially equal in width to lower portion 33 of the support arm. Flange 36 is positioned between the sides 34 for sliding movement relative to the front face of the lower portion of the support arm and the bracket is held in fixed adjusted position with respect to the support arm by cap screws 37 which extend through slots in the lower portion of the arm and engage the flange 34. It will be appreciated that the result and the effect obtained by a construction of this nature is similar to that produced by a design making use of a slide member movable in a guideway.

As shown in Figure 1, the short leg of the bearing bracket 35 is provided at its forward end, that is to say its end most distant from the standard 3, with upper and lower spindle supports 38 and 39 between which there is formed a cutaway portion 40. A hollow spindle 41 is rotatably mounted in ball bearings carried by ball races 42 within the spindle supports. The spindle 41, which extends for some distance beyond both spindle supports, is provided at its upper end with an enlarged head 43 which bears against the upper ball race in the manner shown and is provided with a side extension 44 which surrounds a portion of the upper end of the body of the spindle support 38. A similar construction may be employed at the lower ends of the spindle 41 and spindle support 39, the lower spindle being drawn against its bearings to prevent its longitudinal movement by means of a nut 45 which is threaded onto the lower end thereof. Rotation of the lower spindle is effected through a driven pulley 145 fixed to the spindle in the usual manner and located to rotate within the cutaway portion 40 in the bearing bracket 35.

To support a lens blank carrier 46 upon which a lens blank 47 is blocked in pitch 48 with its concave side upwardly, use is made of a support or extension post 49 which is secured to the spindle 41 and forms an extension thereof. Extension post 49 is provided near its center with a flange 50 having overturned sides 51. In practice, the lower end of the extension post is inserted within the hollow spindle 41 and is maintained in fixed relation thereto by the set screw 52 which extends through the spindle head 43 and engages the periphery of the post.

The upper or tapered end of the post is provided with a pin 53 which is engaged by a notched portion 54 on the shank of the lens blank carrier, as shown in Figure 1, for the purpose of supporting the carrier in fixed relation to the extension post. Pin 53 is so positioned that its longitudinal axis is perpendicular to the longitudinal axis of the extension post. It will be appreciated that by reason of the set screw connection between the extension post and the spindle, the post may be rotated to locate and maintain any point thereon, for example the center of the pin 53, at any desired position with respect to a fixed point on the spindle.

Use is made of this adjustment means to permit formation of a reading segment of desired shape at a desired axis on a blank where some degree of prism is provided in the reading portion thereof. For this purpose a suitable scale and index mark are provided upon the side 51 of the extension post and upon the spindle head 43 as indicated by the reference numeral 55.

A further adjustment for the spindle is afforded by the fine adjustment means employed to locate and maintain the bottom of the extension post flange 50 at a fixed distance from the top of the spindle head. This adjustment may be employed to vary the effective length of the lower spindle 41 but is used only, as will hereinafter appear, in the calibration of the machine. The mechanism for this purpose consists of an elevating and lowering screw 56 which extends through the flange 50 of the extension post and bears against the top surface of the spindle head 43 and a set screw 57 in flange 50 for locking screw 56 in adjusted position.

As already described, extension post 49 supports the lens blank carrier 46 which is detachably mounted thereon. Carrier 46 has a tubular depending shank which fits over the tapered end of the extension post in the manner shown in Figure 1 and has its cutaway portion 54 in engagement with the pin 53 on the extension post. Usually a rubber cup 58 is mounted upon the lens blank carrier 46 to prevent abrasive material used in grinding from contacting the moving parts of the machine. However, a metal shield or tray detachably supported from the back of the bearing bracket can be employed for this purpose. In this connection it should be observed that the side 51 of the extension post flange and the side 44 on the spindle head provide effective means for preventing the abrasive from entering the lower spindle supports and bearings.

It will be appreciated that my construction, by the means of two connected support members, namely, the support arm 30 and bearing bracket 35, not only permits the lower spindle to be suspended from the upper spindle but also supports the lower spindle to swing about a horizontal axis located between the ends of the upper spindle. By suitable design of the support arm 30 and bearing bracket 35, the longitudinal axis A of the lower spindle may be laid out to intersect the center of the pivot connection on the support arm. If the support arm is secured to pivots whose axes intersect and are perpendicular to the longitudinal axis of the upper spindle, as is the case of the studs or pivot members 28, then it will be apparent that the longitudinal axis A of the lower spindle will intersect the longitudinal axis B of the upper spindle at the pivot axis. Equally apparent is the fact that this condition will exist for any position assumed by the lower spindle in its arcuate path of travel or swing about its pivot axis. Moreover, it may be observed that this condition will also hold true where the radius for the swing of the lower spindle has been varied by a change in the effective length of the support arm 30 from that shown in the drawings. As it is an essential that the spindles be positioned in the relation described, it will be immediately appreciated that my construction possesses the very decided advantage of constant maintenance of the spindles in correct grinding relation and thus avoids the difficulties and disadvantages of complicated adjustments, for the spindle axes position, necessary with prior art machines.

Obviously, a change in the effective length of the support arm may be readily made by loosening cap screws 8 and 37 and set screw 13 and then operating crank 11 to raise or lower bracket 5 on spindle housing 6 to a desired position. As a result, the support arm will be moved relative to the bearing bracket 35 over the surface of the flange 36 of the bracket so as to provide a change in the effective length of the support arm or a change in the radius of the arcuate swing of the lower spindle. The movable parts may, of course, be held in their new positions by tightening their securing screws.

During the grinding operation, the lower spindle is swung back and forth about its pivot, its movement being in accordance with predetermined oscillatory impulses imparted by suitable cam actuated mechanism. Among the elements of this mechanism is a cam 59 detachably held upon the lower end of the lower spindle to rotate therewith by means of a nut 60 which is threaded onto the spindle. The cam 59 has an outline identical with that to be given to the reading segment of a lens blank and constantly contacts a cam roller 61 rotatable on a stud 62 secured to the base 63 of a slide member 64 which is movable in a guideway 65 (see Figure 3) on the base 1 of the machine. This slide member 64 forms a housing for the cam mechanism and is provided with a removable cover 66. Secured to the lower end of the lower spindle so as to be freely rotatable thereon is a guide roller 67 which is engaged by a guideway 68 formed in the base 63 of the slide member 64.

By reason of this construction, the cam which rotates with the lower spindle will move that spindle and its support arm back and forth in an arcuate path. As viewed in Figure 1, the left end of this path will be located at the tangency of a point on the flat side of cam 59 with the contact surface of the roller 61 while the length of the path will be determined by the throw of the cam. It will be apparent that shifting of the center of the cam roller 61, by movement of the slide member 64, will cause a similar shifting of the left end of the arcuate path of the lower spindle.

To effect such a shift of the cam roller center as well as to lock slide 64 in adjusted position, an adjusting screw 69 is secured to the right end of the slide member as shown in Figure 1. This screw extends through an upright 70 and is provided on each side thereof with adjusting nuts 71 which are turned up tightly against the upright 70 for holding the slide in adjusted position. In moving the slide in its guideway, the proper nut 71 is loosened and the other nut is tightened against the upright 70 to effect movement in the desired direction, after which the slide is locked in its adjusted position by tightening the loosened nut. For any position of the center of the roller 61 it will be apparent, by reason of my construction, that the axis of the lower spindle will always reach a minimum and a maximum angle with the vertical in its arcuate swinging movement.

Compensation for the arc in which the cam 59 will swing so that its surface will always contact the cam roller 61 is provided by giving a rounded contour to the contact surface of the roller, as indicated at 72 in Figure 1. The support arm 30 and bearing bracket 35 are of such design and are so suspended that the cam surface will normally be held in contact with its roller due to the position of the common center of gravity for the support arm and bearing bracket. However, to prevent any play or loose motion which would be detrimental to the abrading action of the machine, use of some tension means is employed to assure constant contact of the cam and roller. One expedient, shown in Figure 1, utilizes the power transmitting means for rotating the lower spindle to accomplish this purpose. Of course any other tension means, such for example as a spring suitably connected to the back of the support arm 30 and to the front of the standard 3, could be substituted for the construction illustrated.

In the drive and tension means disclosed in Figure 1, a drive pulley 73 on a shaft 74 is driven through a suitable universal joint by a power source, neither of which latter drive means are shown. Drive pulley 73 is connected to the pulley 146 on the lower spindle by a belt 75 which passes around the standard 3 and is guided by guide rollers 76 mounted for rotation on the standard. The lower end of the shaft 74 is carried in a bearing 77 supported by a lever arm 78 which is pivoted to a bracket 79 secured to the base of the machine and which is provided with a counter balance weight 80 adjustable on the lever arm. From an inspection of Figure 1 it will be obvious that weight 80 will place the belt 75 under tension sufficient to assure constant contact of the cam with its roller.

Besides the advantages possessed by the suspension of the lower spindle so that its longitudinal axis always intersects the longitudinal axis of the upper spindle at the pivot axis of the lower spindle for any position of the latter in its swing at any effective length of its support arm 30 and at any setting of the center of the cam roller 61, it should be noted that an important added advantage is obtained by locating the lower end of the cam roller 59 at the lower end of the lower spindle 41. An inherent defect of prior art machines of this type has resided in their frequent spoilage of lens blanks due to chipping of the shoulder of the reading segment during the grinding operation.

The foregoing chipping condition is apparently caused by play or motion between the cam and its roller and would seem to result from jerky oscillatory motion given to the swinging movement of the movable spindle as well as the whip action occurring during the operation of the machine at the end of the movable spindle adjacent the end of the vertical spindle. It would appear that the whipping action of the movable spindle if not resulting from, is at least accentuated in prior art devices, by the design expedient which locates the shifting cam on the end of this spindle adjacent the fixed spindle to add to the weight of the mass of the lens blank carrier or abrading tool which must of necessity be carried on this end of the movable spindle. In my machine, jerky swinging movement is overcome and a smooth oscillatory motion obtained by positioning the cam 59 at the lower end of the lower spindle to make use of the mechanical principle that the smoothness or evenness of oscillatory motion of a lever arm about a pivot will increase with the length from the pivot of the point of application of the actuating force for moving the lever arm. Moreover, location of the cam 59 in the manner described provides very important means for avoiding undesirable whip action by lightening the mass carried at the upper end of the spindle. At the same time, the compact design of the entire machine and the particular type of pivoted support for the lower spindle provides a sturdy and rigid construction adapted to overcome forces of a vibrational or other character set up by its operation and which tend to cause inaccurate or damaged work.

Another important feature of the invention may be found in the means which permits a lens blank carrier to be removed from the lower spindle with the assurance that it may be replaced in the exact position with respect thereto which it had prior to its removal, which means also provide a positive lock for preventing rotation of the spindle. These means comprise a locking pin 81 slidably mounted in the side wall of the slide member as shown in Figure 3 and adapted to engage the bore 82 in the cam 59 as clearly disclosed in Figure 4. When the pin 81 is in locking position, the cam 59 will be held so that the center point of its flat side is in contact with the cam roller 61. A further function of the pin 81 resides in its employment as a support for the bearing bracket 35 during adjustment of the support arm 30. In this latter connection it should be observed that while the lower end of the lower spindle is engaged by the guideway 68 in the slide member 64, the lower spindle is never supported upon the latter or connected thereto when the bearing bracket 35 and support arm 30 are tightly secured to each other by the cap screws 37.

It has been heretofore mentioned that the longitudinal fine adjustment for the extension post 49 is employed in the calibration of the machine for lens curvature. In this regard a surface of any arbitrary curvature, for example one of five diopters, is ground upon the distance portion of test lens blank. Calculation is made of the location at which the pivot axis of the support arm must be held on the spindle housing 6 to grind this curvature, from which position the corresponding one for the upper edge of the support bracket 5 may be readily determined. The support arm 30 and bearing bracket 35 are now adjusted with respect to each other to give the proper radius for the arcuate movement of the lower spindle with the upper edge of the support bracket 5 held in fixed coincidence with its calculated position.

With the machine set as described, the test lens blank and an abrading tool are placed in operative relation and the blank is ground to approximately the desired curvature, following which the lens blank and carrier are removed to measure the curvature of the blank. If the measurement indicates that correction of the setting for the machine is needed to obtain a finished curvature of the desired degree, proper longitudinal adjustment of the extension post is made through the manipulation of the set screws 56 and 57 to either weaken or strengthen the curve being ground and the grinding operation is recommended. Measurement of the curvature with or without adjustment of the spindle is made as many times as is necessary until the test blank has been ground exactly to the desired curvature. When such has occurred the position of the upper edge of the support bracket 5 is fixedly marked upon the spindle housing and a vertical scale 83, graduated in diopters, is laid off on the spindle housing from this mark as reference, the distance between the scale marks being set in accordance with predetermined calculations. Obviously once the spindle housing has been calibrated, the fine adjustment for the longitudinal movement of the spindle is constantly maintained in its adjusted position.

The advantages and features of my invention may be best appreciated by the mode of operation of my machine. It has already been pointed out that my device is designed for the production of multifocal lenses, generally of the bifocal type having a reading portion or segment whose outline is shaped like that of the cam 59 shown in Figure 4 or like the reading segment of the blank illustrated in Figure 9. My machine operates upon the partially finished concave side of a lens blank such, for example, as that disclosed in Figures 5 and 6 wherein a blank 47 has an annular rough ground outer portion 101 which surrounds a circular ground and polished inner portion 102. As may be observed in Figure 6, the circular reading portion 102 is depressed below the surface of the annular rough ground portion 101. It is the function of my device to grind the distance portion of the blank 47 to its desired curvature and in doing so to shape the reading portion to the desired form or, to express it another way, to give the inner boundary of the distance portion a shape like that of the cam 59. By this grinding, some of the upper part of the circular reading portion of Figures 5 and 6 is removed and this part of the blank is given a curvature like that desired for the distance portion.

In operation, the lifting handle 24 is operated to raise and maintain the lifting collar 19 and upper spindle 15 in their inoperative positions and a suitable tool 16 is secured on the spindle end. The same lens blank carrier 46 upon which the blank 47 has been blocked for its grinding and polishing to produce the blank shown in Figures 5 and 6 and from which it has never been removed is then mounted on the lower spindle 41. Assuming, for the purpose of illustration, that it is desired to grind a six diopter curve on the distance portion, the lower spindle is positioned by hand to locate the flat portion of cam 59 in contact with the cam roller 61 as shown in Figure 4, the support pin 81 is engaged with the cam to hold the bearing bracket 35, the cap screws 8 and 37 and the set screw 13 are loosened, and the crank 11 actuated to adjust the support bracket 5 on the six diopter scale mark, after which the cap screws 37 and set screw 13 are tightened to secure the machine in adjusted condition. These just described adjustment operations cause movement of the support arm 30 over the back of the long leg of the bearing bracket 35 and either increase or shorten the effective length of the support arm to give it a length equal to the radius of an arc for a curve of six diopters.

With the thumb screw 27 adjusted to stop the descent of the upper spindle just short of contact with the lens blank, the lifting handle 24 is moved to lower the upper spindle and tool. The horizontal position of the blank with respect to the tool is now adjusted to bring the right hand edge of the tool 16 in slightly overlapping relation to the depressed circular reading portion 101 on the lens blank 47 as disclosed in Figure 1. This adjustment is performed by loosening one of the adjusting screws 71 and tightening the other screw to move the slide member 64 in the desired direction. Positioning of the lens blank with respect to the tool in the manner just described may be readily made by the eye aided with a loupe, it being noted that workers in this art are well accustomed to carrying out such adjustments.

Where there is some degree of prism ground in the reading portion of the blank, it is necessary to orient the blank by rotating it about its longitudinal axis so that the axis of prism in the reading segment will register in a correct predetermined angle during the grinding of the distance portion. The adjustment for this purpose is effected through the set screw 52 and rotation of the extension post 49 through the necessary number of degrees, indicated on scale 55, to provide the proper location for the inner boundary of the distance portion. It should be noted that by reason of the special design given to the support arm 30 and bearing bracket 35 whereby they are hung so as to lie between the standard 3 and the two spindles, that the scale 55 is readily visible. This feature of visible accessibility also materially aids in the horizontal setting of the blank and the tool.

At this stage, all of the adjustments required for carrying out the grinding of the distance portion and shaping of the finished reading portion have been made. With the machine in proper mechanical working order, it being assumed that the circular and depressed reading portion 102 has been properly and accurately ground and polished, it will be unnecessary to vary such adjustments during the entire grinding and polishing operation performed on the lens blank by my machine. The adjustments described are not only few in number but are simple to perform. A multiplicity of complicated adjustments, it is to be observed, is avoided by reason of the inherent characteristic of the machine. This is due to its construction which always maintains the axes of the spindles in the necessary intersecting relation to each other in the same vertical plane irrespective of the vertical position of the pivot for the lower spindle or the angular relation of the axis of the lower spindle to that of the upper spindle or the position of the center of the cam roller on its slide.

Usually before rotation of the spindles is begun, the tool is lowered into grinding contact with the lens blank by manipulation of the thumb screw 27. When the upper end of the thumb screw 27 is within the extension 26, it will be apparent that the lifting collar 19 will be supported upon the upper surface of the support bracket 4 and that the upper spindle will be held at its lowermost position. As the grinding operation continues the thumb screw is actuated to lower the upper spindle. In this connection thumb screw 27 serves not only as a stop to limit the descent of the abrading tool but functions as a feed mechanism for maintaining the tool in grinding contact with the lens blank undergoing processing.

With the tool in grinding contact with the blank, the power driven spindles are caused to rotate in opposite directions to each other to begin grinding of the distance portion and shaping of the polished reading segment of the lens blank. Rotation of the lower spindle will, of course, rotate the cam 59. The cam 59 in conjunction with the force of gravity and the spring like action of the counterweight 80 will cause lens blank 47 to oscillate or swing across the face of the rotating tool 16 under controlled power impulses. As already mentioned, in grinding the distance portion of a one-piece bifocal on a lens blank of the character of the blank 47, a part of the circular reading portion 102 is cut away and is ground to the curvature for the distance portion of the blank. The shape of the cam, in machines of this type, will determine the outline of that part of the circular reading portion 102 left untouched by this grinding action, which outline will be in coincidence with the inner boundary of the distance portion of the completely ground blank and will have a shape identical with that of the working face of the cam.

It is fundamental and well known that an abrading tool will be caused to begin its cut on a lens blank at the center of the line which forms the flat section of the inner boundary of the completely ground distance portion where a cam having a shape like that illustrated in Figure 4 is employed to control apparatus which generates a curved surface in accordance with the grinding principles heretofore set forth. As this grinding continues, a small crescent shaped area ground to the desired curvature for the distance portion of the blank is formed upon the circular reading portion 102. Such an area is indicated in Figures 7 and 8 by the reference character 103. In this intermediate stage of the grinding operation, as may be noted particularly well in Figure 8, only a small part of the circular reading portion 102 of the blank has been cut away. However, formation of the shoulder 104' which lies on the flat boundary between the reading portion and the distance portion of the completely ground blank is shown, in these just mentioned figures of the drawings, as already begun.

The crescent shaped area, on the part of the reading portion which is ground away, increases in size as the grinding operation progresses until all of the circular reading portion 102 that is to be removed has been ground to the desired curvature for the distance portion and the reading portion of the blank is brought to its final shape. The existence of this condition is disclosed in Figure 9 wherein the total area of the original circular reading portion 102 which has been ground down to the finished curvature of the distance portion is shown within the dotted line 105' on a completely ground and polished blank. This results in leaving the reading portion of the blank in finished shape 106 which has an outline like that of the cam 59. At this stage the shoulder 104' which partially surrounds the reading segment has been cut to its maximum width.

As the grinding operation continues, however, a surface 105 of a curvature like that of the area 105' is generated on the original rough ground annular area 101 to complete the formation of a distance portion of desired curvature for the blank 47. As shown in Figures 9 and 10, the concave side of the lens blank after the completion of the grinding operation of my machine is provided with a non-circular reading portion or segment 106 of a shape like the cam 59 and of a curvature identical with that of the ground and polished surface 102 of the partially processed blank, which segment is surrounded by a distance portion ground to a desired curvature different from that of the original annular portion 101. In generating the distance portion, the shoulder 104, whose greatest width is shown in Figure 10, is formed along the upper boundary of the reading segment to partially surround the latter and to extend slightly downwardly along the sides of the segment with decreasing width to merge into the surface of the distance portion 106.

With the grinding completed a suitable polishing tool of the floating type and polishing rouge is substituted for the grinder 16 and grinding emery in order to polish the distance portion 106 generated on the blank by the latter. One form of polishing tool, as shown in Figure 11, comprises a tapered shank 84 adapted to be detachably engaged with the lower end of the upper spindle 15. A block 85 on the lower end of the shank 84 is provided with depending pins 86 and 87. The pin 87 has a spherical or ball head 88 adapted to seat in a central recess in the upper surface of a polishing disk 90 to hold the latter in contact with a blank undergoing polishing. Head 88 provides a pivot between the block 85 and the polishing disk 90 which are secured in driving connection with each other by the loose engagement of pin 86 with one of the recesses 91 provided in the upper surface of the polishing disk near its periphery.

At any point in the previously described grinding operations where it is desired to inspect the blank being ground, actuation of the machine is arrested and the lens blank carrier is removed. Inasmuch as this removal will not affect the relative position of the cam on the lower spindle, it will be obvious that the lens blank carrier, following inspection, will be assured of replacement in proper grinding relation to the abrading tool of the machine by reason of the locating and holding pin 53 being engaged by the notch 54 on the carrier 46.

To be noted is the fact that the shape of the reading segment as well as its width are not limited to the particular type of segment described. The shape of the reading segment, as pointed out, is dependent upon the cam shape. Obviously cams of varied shape are comprehended by the scope of the invention. Also variations in the segment width are contemplated by my invention. Width of the segment may, of course, be changed by substituting a cam of a different throw for the one disclosed or by merely varying the horizontal position of the center of the cam roller so as to cause the abrading tool to begin its cut at the location on the blank desired for the boundary line between the reading and the distance portions.

It will be realized from the foregoing that I have attained the aims and objects of my invention by providing a machine not only of rigid and compact construction but one which is of simple design and operation. By the expedient of assuring a positive angular relation between the fixed and movable spindles, I have been enabled to improve the accuracy of machines of this type and simultaneously to eliminate difficult spindle adjustments which it is impossible to make with any continuous high standard of perfection. Moreover, the production efficiency of apparatus of this general type has been increased by the construction features employed to eliminate chipping of the reading portion during the grinding operation.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention or exceeding the scope of the appended claims.

I claim:

1. Apparatus for producing ophthalmic lens blanks comprising, a spindle rotatably mounted in a fixedly supported spindle housing, a second spindle rotatably mounted in a bearing bracket, an abrading tool on one of said spindles in operative relation to a lens blank held on a lens blank carrier on the other of said spindles, means comprising a support arm pivoted on said spindle housing and connected to said bearing bracket for supporting said second spindle from said housing below the lower end of the first spindle to swing in an arc about a substantially horizontal axis which intersects and is substantially perpendicular to the longitudinal axis of the first spindle, means for rotating said spindles and means driven by said second spindle for causing predetermined arcuate movement of the second spindle about its pivot, said last mentioned means comprising a cam carried by said second spindle and a roller against which said cam is urged.

2. Apparatus for producing ophthalmic lens blanks comprising, a spindle rotatably mounted in a fixedly supported spindle housing, a second spindle rotatably mounted in a bearing bracket, an abrading tool on one of said spindles in operative relation to a lens blank held by a lens blank carrier on the other of said spindles, means comprising a support arm pivoted on said spindle housing and connected to said bearing bracket for suporting said second spindle from said housing below the lower end of the first spindle to swing in an arc about a substantially horizontal axis which intersects and is substantially perpendicular to the longitudinal axis of the first spindle, means for rotating the spindles, cam means on the second spindle adapted to cooperate with roller means whereby to cause predetermined arcuate movement of the second spindle about its pivot and adjustably movable means engaging the end of the second spindle which is away from said first spindle whereby to determine in accordance with the position of said movable means the minimum angle which the longitudinal axis of the second spindle will make with the longitudinal axis of the first spindle during the arcuate swinging movement of the second spindle, the end of said second spindle which is away from said first spindle being rotatable and slidable in said movable means, and adjustment of said movable means being in a path which is substantially perpendicular to the longitudinal axis of the first spindle.

3. Apparatus for producing ophthalmic lens blanks comprising, a spindle rotatably mounted in a fixedly supported spindle housing, a second spindle rotatably mounted in a bearing bracket, an abrading tool on one of said spindles in operative relation to a lens blank held by a lens blank carrier on the other of said spindles, means comprising a support arm pivoted on said spindle housing and connected to said bearing bracket for supporting said second spindle from said housing below the lower end of the first spindle to swing in an arc about a substantially horizontal axis which intersects and is substantially perpendicular to the longitudinal axis of the first spindle, means for rotating said spindles, cam means on the second spindle adapted to cooperate with roller means whereby to cause predetermined arcuate movement of the second spindle about its pivot, adjustable means for securing said bracket and said arm in different relative positions with respect to each other whereby the radius for the arcuate swinging movement of the second spindle about its pivot may be varied and adjustably movable means engaging the end of the second spindle which is most distant from the first spindle whereby to determine in accordance with the position of said movable means the minimum angle which the longitudinal axis of the second spindle will make with the longitudinal axis of the first spindle during the arcuate swinging movement of the second spindle, the end of said second spindle which is most distant from the first spindle being rotatable and slidable in said movable means, and adjustment of said movable means being in a path which is substantially perpendicular to the longitudinal axis of the first spindle.

4. Apparatus for producing ophthalmic lens blanks comprising, a spindle rotatably mounted in a fixedly supported spindle housing, a second spindle rotatably mounted in a bearing bracket, a support post rotatably and longitudinally adjustable with respect to the second spindle connected to the end of said second spindle adjacent said first spindle and forming an extension of the second spindle, an abrading tool connected to and rotated by one of said spindles in operative relation to a lens blank held in a lens blank carrier connected to and rotated by the other of said spindles, means comprising a support arm pivoted on said spindle housing and connected to said bearing bracket for supporting said second spindle from said housing below the lower end of the first spindle to swing in an arc about a substantially horizontal axis which intersects and is substantially perpendicular to the longitudinal axis of the first spindle, means for rotating said spindles, cam means on the second spindle adapted to cooperate with roller means whereby to cause predetermined arcuate movement of the second spindle about its pivot, fastening means carried by said second spindle for securing said post thereto in desired adjusted position and screw threaded fine adjustment means carried by said post and cooperating with said fastening means for moving the post longitudinally relative to said second spindle to vary the effective length of the latter.

5. In a machine for producing ophthalmic lens blanks, the combination with a spindle rotatable in a fixedly supported spindle housing of a second rotating spindle pivotally suspended from said housing for arcuate swinging movement about a substantially horizontal axis which intersects and is substantially perpendicular to the longitudinal axis of the first spindle, said second spindle being mounted so that its longitudinal axis for any position in its arcuate path of travel is fixedly maintained in constant intersecting relation with the longitudinal axis of the first spindle at the intersection of said last mentioned axis with said pivot axis by means comprising a support arm swingable on said pivot and connected to said second spindle, an abrading tool on one of said spindles and a lens blank carrier on the other of said spindles, means for rotating both of said spindles and cam means of predetermined shape on the second spindle whereby to control the arcuate movement of the second spindle about its pivot, movable means adjustable in a path substantially perpendicular to the longitudinal axis of the first spindle for engaging the end of the second spindle which is most distant from the first spindle, a roller carried by said movable means, the end of the second spindle which is most distant from the first spindle being rotatable and slidable in said movable means and force actuated means for urging said cam into contact with said roller.

6. Apparatus for producing ophthalmic lens blanks comprising, a spindle rotatably mounted in a fixedly supported spindle housing, a pivot member slidable upon said housing, a support arm depending from said pivot member to swing in an arcuate path, a bearing bracket secured to said support arm in adjustable sliding relation thereto, a second spindle rotatably mounted within said bearing bracket, a lens blank carrier on the end of said second spindle adjacent the first spindle, a cam of predetermined shape secured to the second spindle outside of said bearing bracket and near the end of said second spindle away from the lens blank carrier, a cam roller in contact with said cam, force actuated means directed to hold the cam against its roller, an abrading tool on the end of said first spindle adjacent said lens blank carrier and means for rotating both of said spindles.

7. Apparatus for producing ophthalmic lens blanks comprising, a spindle rotatably mounted in a fixedly supported spindle housing, a second spindle rotatably mounted in a bearing bracket, an abrading tool on one of said spindles in operative relation to a lens blank held on a lens blank carrier on the other of said spindles, means having a support arm pivoted on said spindle housing and connected to said bearing bracket for supporting said second spindle from said housing below the lower end of the first spindle to swing in an arc about a substantially horizontal axis which intersects and is substantially perpendicular to the longitudinal axis of the first spindle, a cam having a predetermined shape carried on said second spindle, a movable member slidable in a substantially horizontal plane in a direction which is substantially at right angles to said pivot axis, said movable member being located adjacent the second spindle and being provided with a guideway in which the end of the second spindle which is most distant from said first spindle is rotatable and slidable, a roller rotatably mounted on said movable member and against which said cam is urged, and adjusting means associated with said movable member whereby the movable member may be positioned and maintained at a desired location along its path of movement.

8. A machine for producing ophthalmic lens blanks comprising, a substantially horizontal base, a standard on the base, a spindle housing supported from said standard in a substantially vertical position, said housing being located opposite one side of said standard, a spindle rotatably mounted in said housing, a bearing bracket, a second spindle rotatably mounted in said bearing bracket, an abrading tool on one of said spindles in operative relation to a lens blank held by a lens blank carrier on the other of said spindles, a support arm pivoted on said spindle housing and connected to said bearing bracket for supporting said second spindle from said housing below the lower end of said first spindle to swing in an arc about a substantially horizontal axis which intersects the longitudinal axis of the first spindle and which is substantially parallel to said side of said standard, means for rotating said spindles, a guideway carried on said base to extend in a direction towards said side of said standard at a position on the base which is substantially perpendicular to said pivot axis, a slide movable in said guideway, said slide provided with a guideway in which the end of said second spindle most distant from said first spindle is rotatably and slidably engaged, a roller rotatably mounted on said slide, a cam carried on said second spindle, said cam being constantly urged against said roller, and means on said base and connected to said slide whereby to adjust the position of said slide in said guideway.

LEON G. SIMPSON.